(12) United States Patent
Morishita

(10) Patent No.: US 6,793,347 B2
(45) Date of Patent: Sep. 21, 2004

(54) VIDEO PROJECTOR

(75) Inventor: Isaya Morishita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/355,528

(22) Filed: Jan. 31, 2003

(65) Prior Publication Data

US 2003/0174296 A1 Sep. 18, 2003

(30) Foreign Application Priority Data

Feb. 4, 2002 (JP) .................................. 2002-000445 U

(51) Int. Cl.$^7$ ........................... G03B 21/00; H04N 5/64
(52) U.S. Cl. ........................ 353/119; 353/69; 348/789; 352/104
(58) Field of Search ................................. 353/119, 122, 353/20, 37, 50, 84, 69, 70, 115, 72, 74, 79, 77, 87, 101; 248/157, 393, 397, 423, 188.2, 188.4, 188.8, 677, 650; 352/34, 242, 243, 104; 349/58; 359/443, 460; 348/751, 787, 789, 836

(56) References Cited

U.S. PATENT DOCUMENTS 3,733,118 A * 5/1973 Gundlach .................... 352/97
5,800,032 A * 9/1998 Uchiyama et al. ............ 353/69

FOREIGN PATENT DOCUMENTS

| JP | 6-26382 | 4/1994 | ............ H01N/5/74 |
| JP | 9-5883 | 1/1997 | ............ G03B/21/11 |
| JP | 2001-5094 | 1/2001 | ............ G03B/21/00 |

OTHER PUBLICATIONS

Patent Abstracts of Japan, publication No. 2001–005094, publication date of Jan. 10, 2001 (1 page).
Patent Abstracts of Japan, publication No. 09–005883, publication date of Jan, 12, 1997 (2 pages).

* cited by examiner

Primary Examiner—Rodney Fuller
Assistant Examiner—Rochelle Blackman
(74) Attorney, Agent, or Firm—Osha & May L.L.P.

(57) ABSTRACT

A video projector includes a cabinet, and adjusters provided in bottom and top surfaces of the cabinet and located on left and right positions of the bottom and top surfaces close to the front surface of the cabinet. The adjusters are supported by shafts perpendicular to the front surface so as to be rotatable in an angular range of 90°. When the adjusters are postured to be perpendicular to bottom and top surfaces of the cabinet, the cabinet is placed horizontally. When the adjusters are postured to be perpendicular to left and right side surfaces of the cabinet, the cabinet is placed vertically. Since a horizontal/vertical placement change-over switch is operated in accordance with the horizontal/vertical placement of the cabinet, a video image can be projected correctly onto a screen regardless of the horizontal/vertical placement of the cabinet.

9 Claims, 3 Drawing Sheets

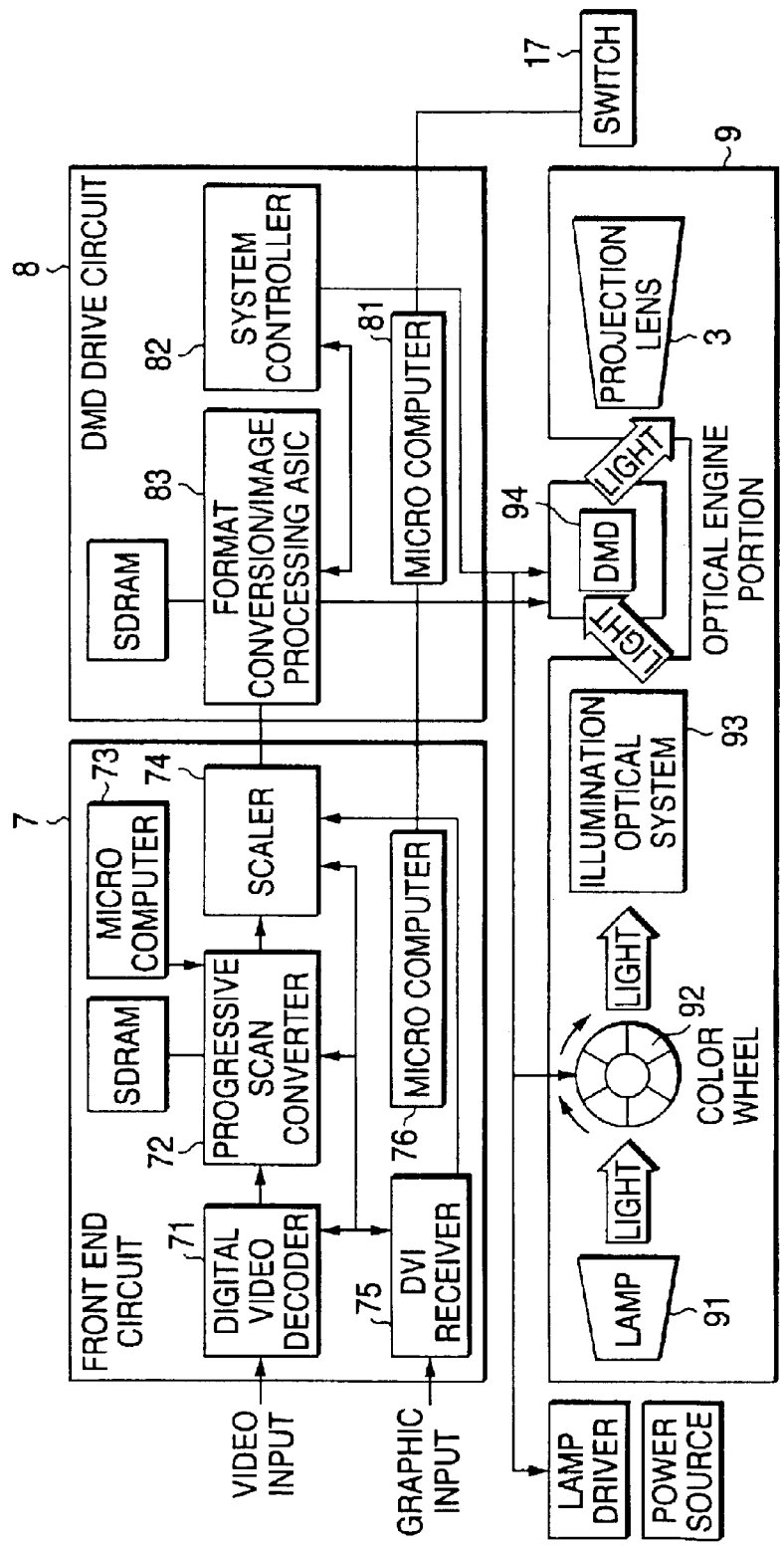

VIDEO PROJECTOR

The present disclosure relates to the subject matter contained in Japanese Utility Model Application No. 2002-000445 filed Feb. 4, 2002, which is incorporated herein by reference in its entirety.

BACKGROUND OF THE INVENTION

1. Field of the Invention

The present invention relates to a video projector for projecting a video image onto a screen.

2. Description of the Related Art

Conventionally, a video projector is used for various purposes such as in-house meeting and seminar presentation. Usually, the video projector is placed on a desk or table, and adjusters are provided in front, rear, right and left sides of a bottom surface of a cabinet body of the video projector in order to adjust up-down or left-right inclination of a video image projected onto a screen (e.g. Japanese Patent Laid-Open No. 5883/1997, Japanese Utility Model Laid-Open No. 26382/1994, Japanese Patent Laid-Open No. 2001-5094).

Generally, the video projector has a light reflecting mirror device driven on the basis of a bit digital video signal, and a projection lens through which light reflected by the light reflecting mirror device is projected. In most cases, the projection lens is disposed in a front surface of the cabinet body so as to be located eccentrically on either right or left side of the front surface because both increase in optical path length in the cabinet of the projector and reduction in size of the cabinet are required.

In the configuration of the video projector described above, the adjusters are provided only in the bottom surface of the cabinet body, so that there is no degree of freedom in placement of the video projector such as horizontal placement or vertical placement. Particularly, when the video projector must be placed on a table having a narrow space or when the video projector can be placed on only a half of a table, it is difficult to adjust and set the video projector properly.

SUMMARY OF THE INVENTION

The invention is developed for solving the problem and an object of the invention is to provide a video projector having degree of freedom in placement of the video projector such as horizontal placement or vertical placement to facilitate placement and/or adjustment of the video projector for projection of a video image onto a screen.

In order to achieve the foregoing object, according to a first aspect of the invention, there is provided a video projector having: a light source; a light reflecting mirror device for reflecting light emitted from the light source; a light reflecting mirror device drive circuit for driving the light reflecting mirror device on the basis of a bit digital video signal; a cabinet which is shaped like a flat and substantially rectangular cube, and in which the light source, the light reflecting mirror device and the light reflecting mirror device drive circuit are disposed, the cabinet having front, bottom, top, left side and right side surfaces; a projection lens which is provided in the front surface of the cabinet so as to be located eccentrically on either of left or right side of the front surface and by which a video image of reflected light formed by the light reflecting mirror device is enlarged and projected onto a screen; adjusters provided in the bottom and top surfaces of the cabinet and located on left and right sides of the bottom and top surfaces close to the front surface of the cabinet for adjusting inclination and/or height of the projector when the projector is placed on a table, the adjusters being supported by shafts perpendicular to the front surface so as to be rotatable in an angular range of at least 90°, the adjusters being configured so that postures of the adjusters are retained in accordance with placement of the cabinet in such a manner that the cabinet is placed horizontally when the adjusters are postured to be perpendicular to the bottom and top surfaces of the cabinet and the cabinet is placed vertically when the adjusters are postured to be perpendicular to the left and right side surfaces of the cabinet; and a horizontal/vertical placement change-over switch for supplying a signal to the light reflecting mirror device drive circuit in accordance with the placement of the projector in such a manner that the signal is generated as a signal for rotating a video image formed on the basis of the bit digital video signal left or right by 90° when horizontal placement of the cabinet needs to be changed over to vertical placement, and that the signal is generated as a signal for turning the video image upside down when the cabinet placed horizontally needs to be turned upside down.

In the configuration, the cabinet is placed horizontally when the adjusters are postured to be perpendicular to the bottom surface of the cabinet, but the cabinet is placed vertically when the adjusters are postured to be perpendicular to the right and left side surfaces of the cabinet. In addition, when the cabinet is placed horizontally, the placement mode of the cabinet can be selected from a normal mode in which the bottom surface of the cabinet faces downward and a reverse mode in which the top surface of the cabinet faces downward, that is, the cabinet is turned upside down. In accordance with the mode selection, the projection lens can be located eccentrically on either of the left and right sides of the cabinet when viewed from the front of the cabinet. In addition, when the cabinet is placed vertically, the placement mode of the cabinet can be selected from a mode in which the left side surface of the cabinet faces downward and a mode in which the right side surface of the cabinet faces downward. In addition, when the cabinet is placed horizontally or vertically, the horizontal/vertical placement change-over switch can be operated as follows. When the cabinet placed horizontally needs to be placed vertically, the horizontal/vertical placement change-over switch can be operated so that a video image formed on the basis of the bit digital video signal at the time of the horizontal placement of the cabinet is rotated left or right by 90° to achieve the vertical placement of the cabinet. On the other hand, in the case where the projector needs to be turned upside down when the cabinet is placed horizontally, the horizontal/vertical placement change-over switch can be operated so that a video image is turned upside down. In this manner, the video image projected onto the screen is always provided as a normally erecting image.

According to a second aspect of the invention, there is provided a video projector having: a cabinet shaped like a flat and substantially rectangular cube, the cabinet having front, bottom, top, left side and right side surfaces; a projection lens which is provided in the front surface of the cabinet so as to be located eccentrically on either of left or right side of the front surface and by which a video image is enlarged and projected; and adjusters provided in the bottom and top surfaces of the cabinet and located on right and left sides of the bottom and top surfaces close to the front surface of the cabinet for adjusting inclination and/or height of the projector when the projector is placed on a table, the adjusters being supported rotatably by shafts perpendicular to the front surface, wherein the cabinet can be placed freely regardless of whether it is placed horizontally or vertically, in such a manner that the cabinet is placed horizontally when the adjusters are postured to be perpendicular to the bottom and top surfaces of the cabinet and the cabinet is placed vertically when the adjusters are postured to be perpendicular to left and right side surfaces of the cabinet. In this configuration, the cabinet is placed horizontally when the adjusters are postured to be perpendicular to the bottom surface of the cabinet, but the cabinet is placed vertically when the adjusters are postured to be perpendicular to the left and right side surfaces of the cabinet. In this manner, the projector can be placed in any desirable posture, so that a video image can be projected onto the screen from any position.

According to a third aspect of the invention, there is provided a video projector defined in the second aspect of the invention and further having a horizontal/vertical placement change-over switch for performing change-over in accordance with horizontal/vertical placement of the cabinet to generate a signal for rotating a projected video image left or right by 90° when horizontal placement of the cabinet is changed over to vertical placement. In this configuration, the video image can be projected onto a screen correctly regardless of whether the video projector (cabinet) is placed horizontally or vertically.

BRIEF DESCRIPTION OF THE DRAWINGS

FIG. 7 is a diagram of an electric block configuration of the video projector.

DETAILED DESCRIPTION OF THE PREFERRED EMBODIMENTS

Figure 1:
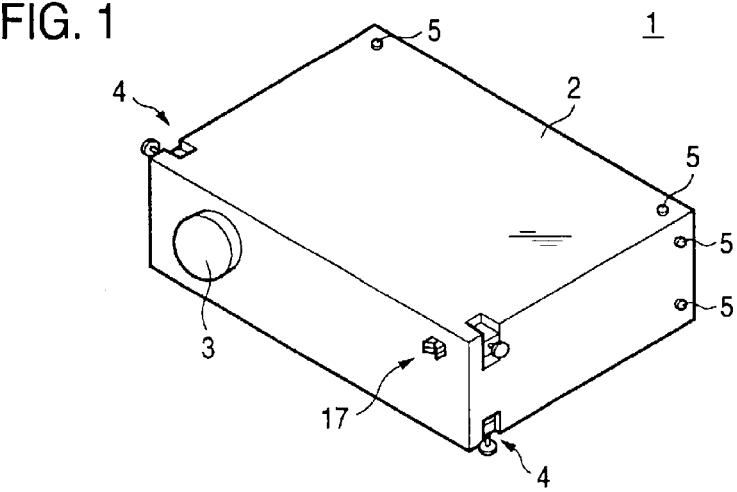
FIG. 1 is a perspective view of a video projector according to a first embodiment of the invention.

A video projector according to an embodiment of the invention will be described below with reference to the accompanying drawings. FIG. 1 shows the external appearance of the video projector. The video projector 1 (hereinafter referred to as "projector") includes a cabinet 2 shaped like a flat and substantially rectangular cube. Though not shown, a light source, a light reflecting mirror device for reflecting light emitted from the light source, and a light reflecting mirror device drive circuit for driving the light reflecting mirror device on the basis of a bit digital video signal are disposed in the cabinet 2. The projector 1 further includes a projection lens 3 for enlarging a video image of the light reflected by the light reflecting mirror device and projecting the video image onto a screen. In this embodiment, the projection lens 3 is provided in the front surface of the cabinet 2 so as to be located eccentrically on the left side of the front surface of the cabinet 2. The projector 1 further includes adjusters 4 which are disposed in top and bottom surfaces of the cabinet 2 and located on left and right sides of the top and bottom surfaces close to the front surface of the cabinet 2 for adjusting inclination and/or height of the projector 1 when the projector 1 is placed on a table. The projector 1 further includes slip stopper rubber legs 5 which are attached to the cabinet 2 so as to be located on right and left sides of bottom, top, left and right side surfaces of the cabinet 2 close to the rear surface of the cabinet 2. The slip stopper rubber legs 5 themselves may be configured to be adjustable in height (length). The projector 1 further includes a horizontal/vertical placement change-over switch 17 which is provided to be operated by a user in accordance with the state of placement of the projector 1 so that the projector 1 can be placed horizontally or vertically, that is, the cabinet 2 can be placed horizontally or vertically.

Figure 2:
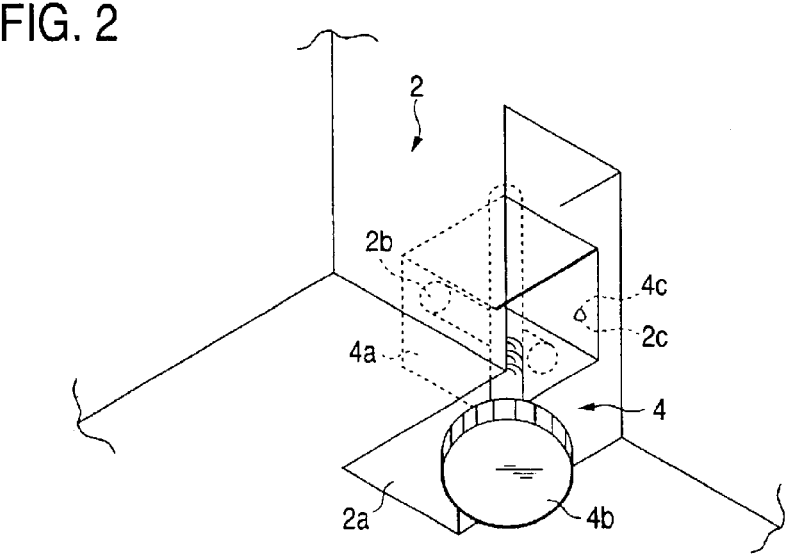
FIG. 2 is a bottom perspective view of one of the adjusters of the projector.

FIG. 2 shows the configuration of a portion of one of the adjusters 4. In FIG. 2, one of the adjusters 4 located in the bottom surface of the cabinet 2 is viewed from the bottom. Recesses 2a are formed in the cabinet 2 so as to be located on right and left sides of the bottom and top surfaces of the cabinet 2 close to the front surface of the cabinet 2. Each adjuster 4 is supported in corresponding one of the recesses 2a by a shaft 2b perpendicular to the front surface of the cabinet 2 so as to be rotatable within an angular range of at least 90°. Each adjuster 4 has a shaft support 4a supported by the shaft 2b, and an adjuster control leg 4b. The adjuster control leg 4b has a screw rod thread-engaged with a screw hole formed in the shaft support 4a. When the adjusters 4 are postured to be perpendicular to the bottom and top surfaces of the cabinet 2, or when the adjusters 4 are postured to be perpendicular to the right and left side surfaces of the cabinet 2, the adjusters 4 have a stopper function for retaining the postures. As a configuration for such a stopper function, an indented portion 2c is formed at a proper place of one wall surface in each of the recesses 2a of the cabinet 2 whereas a protruded portion 4c capable of being fitted into the indented portion 2c is formed on the side surface of corresponding one of the shaft supports 4a opposite to the indented portion 2c. When the indented portion 2c and the protruded portion 4c are fitted to each other, the rotating operation of a corresponding shaft support 4a is locked.

In the projector 1 thus configured, when each of the adjuster control legs 4b is rotated to change the thread-engagement height of the adjuster control leg 4b with respect to the corresponding shaft support 4a, the protrusion dimension (height) of each adjuster 4 from the cabinet 2 can be adjusted to thereby achieve inclination/height adjustment of the projector 1. When a video image projected onto the screen needs to be moved down, each of the adjuster control legs 4b may be rotated in a direction so that the protrusion dimension of the adjuster control leg 4b from the cabinet 2 is reduced. On the other hand, when a video image projected onto the screen needs to be moved up, each of the adjuster control legs 4b may be rotated in a direction so that the protrusion dimension of the adjuster control leg 4b from the cabinet 2 is increased. In this manner, the inclination/height of the projector 1 can be adjusted in accordance with the direction of rotation of each adjuster control leg 4b.

Figure 3A:
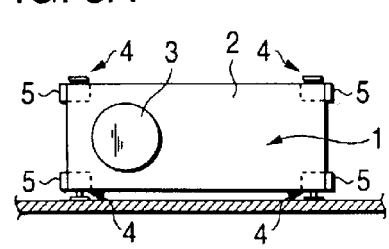
FIG. 3A is a front view showing a state in which the video projector is placed horizontally with its projection lens located on the right side.
Figure 3B:
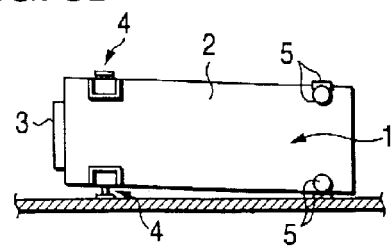
FIG. 3B is a side view of the video projector.
Figure 4A:
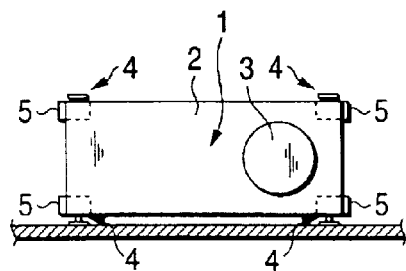
FIG. 4A is a front view showing a state in which the video projector is placed horizontally with its projection lens located on the left side.
Figure 4B:
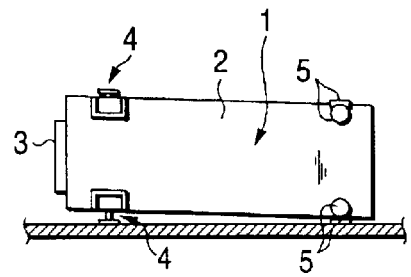
FIG. 4B is a side view of the video projector.

FIGS. 3A and 3B, FIGS. 4A and 4B, FIGS. 5A and 5B, and FIGS. 6A and 6B show various placement states of the projector 1 on a table. When the adjusters 4 are postured to be perpendicular to the bottom surface of the cabinet 2 as shown in FIGS. 3A and 3B, the cabinet 2 is generally placed horizontally. On this occasion, the projection lens 3 is located on the left side when viewed from the front of the projector. When the adjusters 4 are postured to be perpendicular to the top surface of the cabinet 2 as shown in FIGS. 4A and 4B, the projector 1 is placed horizontally in a reverse mode in which the top surface of the cabinet 2 faces downward, that is, the projector 1 is turned upside down. On this occasion, the projector is placed horizontally with the projection lens 3 located on the right side when viewed from the front of the projector.

Figure 5A:
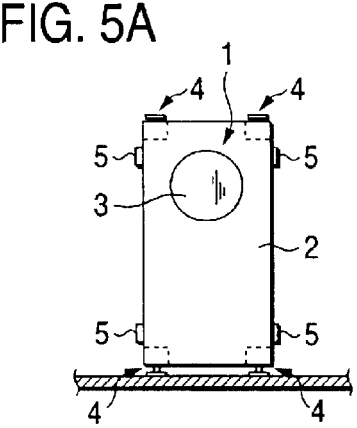
FIG. 5A is a front view showing a state in which the video projector is placed vertically with its projection lens located on the upper side.
Figure 5B:
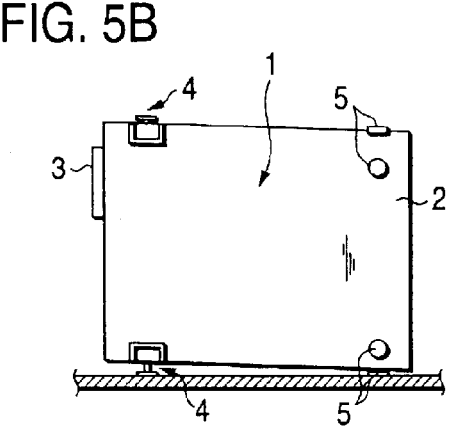
FIG. 5B is a side view of the video projector.
Figure 6A:
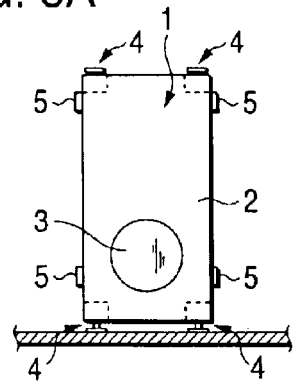
FIG. 6A is a front view showing a state in which the video projector is placed vertically with its projection lens located on the lower side.
Figure 6B:
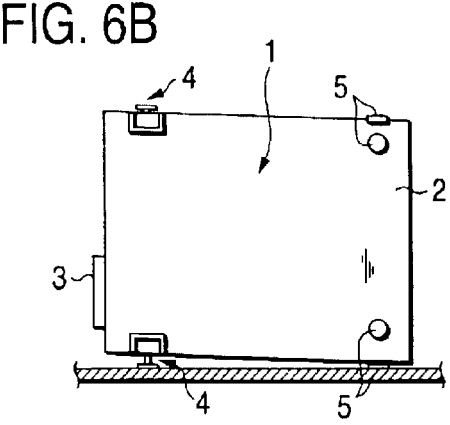
FIG. 6B is a side view of the video projector.

When the adjusters 4 are postured to be perpendicular to the right side surface of the cabinet 2 that is far side from the projection lens 3, as shown in FIGS. 5A and 5B, the cabinet 2 is placed vertically with the projection lens 3 located on the upper side. On the other hand, when the adjusters 4 are postured to be perpendicular to the left side surface of the cabinet 2 that is close side to the projection lens 3, as shown in FIGS. 6A and 6B, the cabinet 2 is placed vertically with the projection lens 3 located on the lower side.

When the protruded portions 4c provided in the shaft supports 4a are fitted into the indented portions 2c of the recesses 2a of the cabinet 2 in each of the states of horizontal placement and vertical placement, the rotating operations of the shaft supports 4a are prohibited so that the postures of the adjusters 4 are retained.

FIG. 7 shows an electric block configuration of the video projector 1. The video projector 1 includes a front end circuit 7, an optical engine portion 9, and a DMD drive circuit 8. These circuits 7 to 9 are provided in the cabinet 2. The front end circuit 7 converts a video input or graphic input into a digital bit digital video signal. The optical engine portion 9 is provided so that the digital bit digital video signal generated by the front end circuit 7 is projected onto a screen. The DMD drive circuit 8 drives a light reflecting mirror device (hereinafter referred to as "DMD") 94 of the optical engine portion 9.

The optical engine portion 9 has a lamp 91, a color wheel 92, an illumination optical system 93, and a projection lens 3. The lamp 91 emits white light rays to illuminate the DMD 94. The color wheel 92 has a disc, and R/G/B color filters arranged on the disc. The color wheel 92 converts the white light rays emitted from the lamp 91 into light rays of red, green and blue successively. The illumination optical system 93 illuminates the DMD 94 uniformly with light as much as possible. The projection lens 3 projects an image formed by micro mirrors of the DMD 94 onto the screen.

The DMD 94 is a device having a window portion in its center. The window portion of the DMD 94 is illuminated with light emitted from the lamp 91, so that reflected light through the window portion is enlarged and projected by the projection lens. In the case of an SVGA device, about 500,000 micro mirrors each having a size of 16.2 $\mu$m square are arranged at very narrow intervals of 0.8 $\mu$m and integrated on a semiconductor memory in which memory cells are allocated to the micro mirrors respectively. Each micro mirror is inclined in a direction in accordance with the memory value of a corresponding memory cell. When light reflected by each micro mirror is led into the projection lens 3, the reflected light is projected as a bright dot onto the screen. When light reflected by each micro mirror is not led into the projection lens 3, the reflected light is projected as a black dot onto the screen. Direction control of the micro mirrors is switched at a high speed to express gradations.

The DMD drive circuit 8 has a micro computer 81, a system controller 82, and a format conversion/image processing ASIC 83. A control signal from the micro computer 81 and the system controller 82 is supplied to the format conversion/image processing ASIC 83 to control the inclination of each micro mirror. The horizontal/vertical placement change-over switch 17 is connected to the micro computer 81. The change-over switch 17 is configured so that change-over for discriminating between a normal mode and a reverse mode can be performed in the horizontal placement of the cabinet 2, and so that change-over for discriminating between a right rotation mode and a left rotation mode can be performed in the vertical placement of the cabinet 2. For example, the change-over switch 17 can be embodied by a double tumbler switch.

When the horizontal placement of the cabinet 2 in this configuration needs to be changed over to vertical placement with the projection lens 3 located on the upper side, the user operates the horizontal/vertical placement change-over switch 17 into a vertical placement and right rotation mode. In accordance with this operation, a signal for rotating the video image left by 90° is supplied to the micro computer 81. In accordance with the signal, coordinates of pixels based on the digital video signal supplied from the front end circuit 7 are transformed by the format conversion/image processing ASIC 83, so that a video image rotated left by 90° is obtained. Accordingly, angular correction of the video image is achieved, so that the video image is projected onto the screen correctly regardless of whether the cabinet 2 is placed horizontally or vertically.

On the other hand, when the horizontal placement of the cabinet 2 needs to be changed over to vertical placement with the projection lens 3 located on the lower side, the user operates the horizontal/vertical placement change-over switch 17 into a vertical placement and left rotation mode. In accordance with the operation, a signal for rotating a video image right by 90° is supplied to the micro computer 81. In accordance with the signal, coordinates of pixels based on the digital video signal supplied from the front end circuit 7 are transformed by 270° by the format conversion/image processing ASIC 83, so that a video image rotated right by 90° is obtained. Accordingly, the video image is projected onto the screen correctly regardless of whether the cabinet 2 is placed horizontally or vertically.

In addition, when the cabinet 2 placed horizontally needs to be turned upside down, the user operates the horizontal/vertical placement change-over switch 17 into a horizontal placement and top-and-bottom-reversing mode. In accordance with this operation, a signal for turning the video image upside down is supplied to the micro computer 81. In accordance with the signal, coordinates of pixels based on the digital video signal supplied from the front end circuit 7 are transformed by 180° by the format conversion/image processing ASIC 83, so that a video image rotated left by 180° is obtained. Accordingly, the video image is projected onto the screen correctly regardless of whether the cabinet 2 is placed horizontally or vertically.

In the video projector 1 according to this embodiment, the adjusters 4 can be rotated relative to the cabinet 2 so that the placement of the video projector 1 can be changed from horizontal placement to vertical placement or from vertical placement to horizontal placement freely. The horizontal/vertical placement change-over switch 17 can be operated to prevent the video image from being reversed due to the change of placement. Hence, the video image can be projected onto the screen correctly regardless of whether the cabinet 2 is placed horizontally or vertically.

The invention is not limited to the embodiment and various modifications may be made. Although the embodiment has been described on the case where the adjusters 4 are supported by the shafts 2b in the recesses 2a formed in the cabinet 2 so as to be rotatable in an angular range of 90°, the invention may be also applied to the case where the dimension of each recess 2a in a portion close to the center is increased while the adjusters 4 are supported to be rotatable in an angular range of 180° so that all the adjusters 4 can be received in the recesses 2a when the projector is not in use.

Although the embodiment has been described on the case where the horizontal/vertical placement change-over switch 17 is used as change-over means for correctly projecting a video image onto the screen, the invention is not limited thereto and may be also applied to the case where a gyro sensor is provided in the projector so that a detection signal of the gyro sensor is supplied to the micro computer to thereby achieving the angular correction of the video image automatically.

As described above, according to the first aspect of the invention, there is provided a video projector which is simply formed to have adjusters provided in bottom and top surfaces of a cabinet and located on left and right sides of the bottom and top surfaces close to the front surface of the cabinet so as to be rotatably supported, and a horizontal/vertical placement change-over switch operated so that a video image is rotated left or right by 90° when horizontal placement of the cabinet needs to be changed over to vertical placement, and so that the video image is reversed when the cabinet placed horizontally needs to be turned upside down. With such a simple configuration, the cabinet can be placed freely horizontally or vertically. In addition, the video image can be projected correctly onto a screen. Accordingly, the degree of freedom in placement of the video projector is increased, so that placement/adjustment of the video projector can be made easy when the video projector is placed on a narrow table for use. The video projector can be therefore used as a monitor of a personal computer and effective as a home theater used in a home with a narrow space.

According to the second aspect of the invention, there is provided a projector which is simply formed to have adjusters provided in bottom and top surfaces of a cabinet and located on right and left sides of the bottom and top surfaces close to the front surface of the cabinet so as to be rotatably supported. With such a simple configuration, the cabinet can be placed freely horizontally or vertically.

According to the third aspect of the invention, the cabinet can be placed freely horizontally or vertically, so that a video image can be rotated in accordance with the placement of the cabinet. Accordingly, the video image can be projected correctly onto a screen regardless of whether the cabinet is placed horizontally or vertically.

What is claimed is:

1. A video projector comprising:
   a light source; a light reflecting mirror device for reflecting light emitted from the light source;
   a light reflecting mirror device drive circuit for driving the light reflecting mirror device on the basis of a bit digital video signal;
   a cabinet which is shaped like a flat and substantially rectangular cube, and in which the light source, the light reflecting mirror device and the light reflecting mirror device drive circuit are disposed, the cabinet having front, bottom, top, left side and right side surfaces;
   a projection lens which is provided in the front surface of the cabinet so as to be located eccentrically on either of left or right side of the front surface and by which a video image of reflected light formed by the light reflecting mirror device is enlarged and projected onto a screen;
   adjusters provided in the bottom and top surfaces of the cabinet and located on left and right sides of the bottom and top surfaces close to the front surface of the cabinet for adjusting inclination and/or height of the projector when the projector is placed on a table, the adjusters being supported by shafts perpendicular to the front surface so as to be rotatable in an angular range of at least 90°, the adjusters being configured so that postures of the adjusters are retained in accordance with placement of the cabinet in such a manner that the cabinet is placed horizontally when the adjusters are postured to be perpendicular to the bottom and top surfaces of the cabinet and the cabinet is placed vertically when the adjusters are postured to be perpendicular to the left and right side surfaces of the cabinet; and
   a horizontal/vertical placement change-over switch for supplying a signal to the light reflecting mirror device drive circuit in accordance with the placement of the projector in such a manner that the signal is generated as a signal for rotating a video image formed on the basis of the bit digital video signal left or right by 90° when horizontal placement of the cabinet needs to be changed over to vertical placement, and that the signal is generated as a signal for turning the video image upside down when the cabinet placed horizontally needs to be turned upside down.

2. A video projector comprising:
   a cabinet shaped like a flat and substantially rectangular cube, the cabinet having front, bottom, top, left side and right side surfaces;
   a projection lens which is provided in the front surface of the cabinet so as to be located eccentrically on either of left or right side of the front surface and by which a video image is enlarged and projected; and
   adjusters provided in the bottom and top surfaces of the cabinet and located on right and left sides of the bottom and top surfaces close to the front surface of the cabinet for adjusting inclination and/or height of the projector when the projector is placed on a table, the adjusters being supported rotatably by shafts perpendicular to the front surface,
   wherein the cabinet can be placed freely regardless of whether it is placed horizontally or vertically, in such a manner that the cabinet is placed horizontally when the adjusters are postured to be perpendicular to the bottom and top surfaces of the cabinet and the cabinet is placed vertically when the adjusters are postured to be perpendicular to left and right side surfaces of the cabinet.

3. A video projector according to claim 2, further comprising a horizontal/vertical placement change-over switch for performing change-over in accordance with horizontal/vertical placement of the cabinet to generate a signal for rotating a projected video image left or right by 90° when horizontal placement of the cabinet is changed over to vertical placement,
   wherein the video image can be projected onto a screen correctly regardless of whether the cabinet is placed horizontally or vertically.

4. A video projector comprising:
   a substantially rectangular housing;

a projector lens eccentrically positioned on a front surface of the housing to project light;

a plurality of adjusters disposed proximate to corners on the front surface, wherein each of the plurality of adjusters rotates at least from a horizontal to vertical position;

a switch disposed on the housing; and a circuit electrically connected to the switch, wherein the circuit identifies which direction a top surface of the housing is in based on a signal from the switch, and rotates a video image in the identified direction.

5. The video projector according to claim 4, the video projector further comprises a plurality of shafts to pivotally support the plurality of adjusters respectively, wherein each of the plurality of shafts is disposed in respective recesses formed on the housing.

6. The video projector according to claim 5, wherein each of the plurality of adjusters rotates on the shaft within 180° such that the adjuster is accommodated in the recess when the adjuster rotates by 180°.

7. The video projector according to claim 5, the video projector further comprises a stopper potion to fix a rotation of the adjuster, wherein the stopper potion comprises a dented portion and a protruded portion to fit into the dented portion.

8. The video projector according to claim 4, wherein the switch is disposed on the front surface of the housing.

9. The video projector according to claim 4, wherein the switch is a double-tumbler switch.

* * * * *